United States Patent
Fish et al.

(10) Patent No.: US 7,590,799 B2
(45) Date of Patent: Sep. 15, 2009

(54) OSD DETERMINISTIC OBJECT FRAGMENTATION OPTIMIZATION IN A DISC DRIVE

(75) Inventors: Wilson Massey Fish, Yukon, OK (US); Bang Cong Nguyen, Oklahoma City, OK (US); Jack Allen Mobley, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 797 days.

(21) Appl. No.: 11/154,307

(22) Filed: Jun. 16, 2005

(65) Prior Publication Data

US 2006/0288156 A1    Dec. 21, 2006

(51) Int. Cl.
  *G06F 13/00* (2006.01)
(52) U.S. Cl. ............... 711/112; 711/154; 360/72.1; 360/73.03; 360/75; 360/260
(58) Field of Classification Search ............... 711/112, 711/154; 360/72.1, 73.03, 75, 260
See application file for complete search history.

(56) References Cited

U.S. PATENT DOCUMENTS

| | | | |
|---|---|---|---|
| 5,325,506 A | 6/1994 | Tohchi et al. | |
| 5,345,575 A | 9/1994 | English et al. | |
| 5,708,632 A | 1/1998 | Totsuka et al. | |
| 5,708,793 A | 1/1998 | Franaszek et al. | |
| 6,298,401 B1 | 10/2001 | Anderson | |
| 6,321,358 B1 | 11/2001 | Anderson | |
| 6,636,941 B1 | 10/2003 | Gold et al. | |
| 6,754,036 B2 | 6/2004 | Dehnert | |
| 2003/0088591 A1 | 5/2003 | Fish | |
| 2004/0044705 A1* | 3/2004 | Stager et al. | ............... 707/204 |
| 2005/0076185 A1 | 4/2005 | Bhatti | |

FOREIGN PATENT DOCUMENTS

| | | |
|---|---|---|
| JP | 2000217066 A | 8/2000 |
| WO | WO03027909 A1 | 4/2003 |

OTHER PUBLICATIONS

R. M. English et al., "Loge: A Self-Organizing Disk Controller," Published in *Proceedings of USENIX Winter 1992 Technical Conference*, San Francisco, CA, Jan. 20-24, 1992, pp. 237-251.
M. Mesnier et al., "Object-Based Storage," *IEEE Communications Magazine*, Aug. 2003, pp. 84-90.

\* cited by examiner

*Primary Examiner*—Reba I Elmore
(74) *Attorney, Agent, or Firm*—Robert P. Lenart, Esq.; Pietragallo Gordon Alfano Bosick & Raspanti, LLP (57) ABSTRACT

An apparatus includes a storage medium, an arm for positioning a recording head adjacent to the storage medium, and a controller for receiving objects and for selecting blocks on the storage medium to be written by the recording head based on information in the objects. A method for storing objects is also provided. In another aspect, the invention provides a method for writing data in data storage devices. The method includes: receiving access commands for objects, selecting blocks on a storage medium to be written by a recording head based on information in the objects, and writing data from the objects to the selected blocks.

18 Claims, 5 Drawing Sheets

OSD DETERMINISTIC OBJECT FRAGMENTATION OPTIMIZATION IN A DISC DRIVE

FIELD OF THE INVENTION

This invention relates generally to the field of data storage systems, and more particularly, to an apparatus and methods for optimizing the storage of data in a data storage device.

BACKGROUND OF THE INVENTION

Block data storage devices store and/or retrieve digital data in the form of blocks, which are individually addressable by a host device. Exemplary block data storage devices include hard disc drives, optical disc recorders and players, and magnetic digital tape recorders and players.

Such devices typically include a hardware/firmware based interface circuit having a buffer (first memory location), a communication channel and a recordable medium (second memory location). The user memory space of the second memory location is divided into a number of addressable blocks, which are assigned host-level addresses (sometimes referred to as logical block addresses or LBAs). Each LBA typically has a corresponding physical block address (PBA) used by servo control circuitry to align a data transducing head with the appropriate portion of a storage medium to access the desired LBA.

To write data to the medium, the host device issues a write command comprising the user data to be stored by the storage device along with a list of LBAs to which the user data are to be stored. The storage device temporarily stores the user data in the first memory location, schedules movement of the data transducing head to the appropriate location(s) over the medium, and then uses write channel portions of the communication channel to apply the appropriate encoding and conditioning of the data to write the data to the selected LBAs.

To subsequently read the data from the storage device, the host device issues a read command identifying the LBAs from which data are to be retrieved. The storage device schedules movement of the data transducing head to the appropriate location(s) over the medium, and then uses read channel portions of the communication channel to decode readback data which are placed into the first memory location (buffer) for subsequent transfer back to the host device.

In practice, as files are created, extended and deleted, the available disc media becomes fragmented. Nearly every computer disc oriented file system suffers from file data fragmentation. File systems attempt to minimize the seek time between associated file fragments by keeping fragments logically close together on the disc. Since the file system does not know the exact underlying physical disc organization and architecture, it is designed to assume that logical blocks that have addresses close to one another will also be physically close together on the media.

Each file fragment read from media requires a separate media access command both on the host and within the disc drive. Since the internal disc drive command processing overhead value is unknown to the file system, the system may unwittingly select blocks on the media for file fragments which result in the worst possible performance instead of the best performance. This can happen when each fragment, although nearly sequential on disc, incurs in an extra disc revolution for each read/write operation due to command overhead processing time, spoiling the access such that the head just misses the requested block and must wait for an entire revolution of the disc in order to try again.

Object-based storage device (OSD) technology is being developed at the disc drive level. OSD access by a host differs from standard block oriented protocols in a profound way. Data are addressed as objects, and the smallest addressable unit in an OSD disc drive is a byte. Additionally, a significant portion of the file system is abstracted within the disc drive. The physical location and organization of data is hidden from the host and is managed by the disc drive unit.

Object-based storage is an extension of the small computer system interface (SCSI) command set. The object-based storage command set shifts or delegates certain functionality and intelligence from the host to the individual storage devices. It does this by managing and storing a file and its metadata together as one coherent object, maintaining the connection down to the object-based storage devices (for example, a controller, a disc array, or an individual disc drive).

Higher level infrastructure activities are delegated to the lowest-level devices, decreasing traffic and enabling new functionality that software alone cannot provide. This enables greater scalability and performance, dynamic reconfiguration, host interoperability, native security, and enhanced reliability.

An object-based storage device can be a network-attached storage device that presents an interface of arbitrarily-named data objects of variable size rather than sequentially numbered fixed-size blocks, to deal with the data storage details, such as request scheduling and data layout. Metadata can be managed separately by one or more specialized metadata servers. The separation of data and metadata storage and management provides very high access bandwidth to the large-scale distributed storage systems.

OSD architecture treats storage neither as blocks nor files, but as objects. The primary distinction between a file and an object is that an object maintains a coupling between object data and primary metadata. Primary metadata includes access time, permissions, logical object size, etc. For example, an object could be a single database record, or table, or the entire database itself. An object may contain a file, or just a portion of a file. The storage device is aware of this content and can handle the lower-level details of device management, like block allocation.

Typical disc drive interface protocols (such as SCSI, FC, ATA, etc.) access disc data as logical blocks, with all file system organization being abstracted within the host. The smallest addressable unit in a disc drive is a block. In contrast, the smallest addressable unit in an OSD disc drive is a byte. Additionally, the significant portion of the file system is abstracted within the disc drive. Data are addressed as objects. The physical location and organization of data is hidden from the host and is managed by the disc drive unit.

It would be desirable to utilize the characteristics of an object oriented file system to minimize seek overhead during file access.

SUMMARY OF THE INVENTION

This invention provides an apparatus comprising a storage medium, an arm for positioning a recording head adjacent to the storage medium, and a controller for receiving objects and for selecting blocks on the storage medium to be written by the recording head based on information in the objects.

In another aspect, the invention provides a method for writing data in data storage devices. The method comprises: receiving access commands for objects, selecting blocks on a storage medium to be written by a recording head based on information in the objects, and writing data from the objects to the selected blocks.

DETAILED DESCRIPTION OF THE INVENTION

Figure 1:
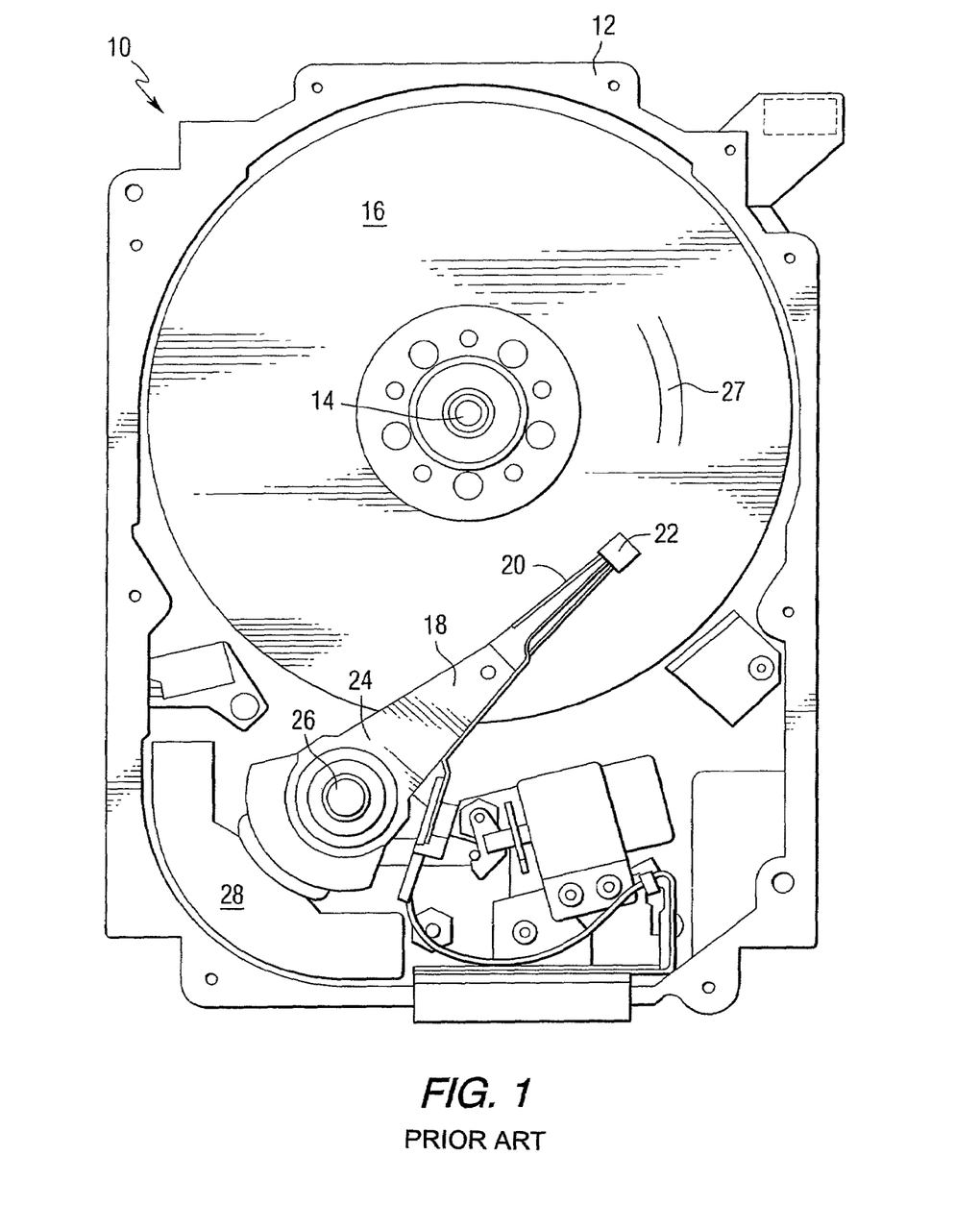
FIG. 1 is a pictorial representation of the mechanical portion of a disc drive constructed in accordance with the present invention.

Referring to the drawings, FIG. 1 is a pictorial representation of the mechanical portion of a disc drive 10 that can be constructed in accordance with the invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor, which may be a voice coil motor 28, is located at the arm's second end 24, for pivoting the arm 18 to position the head 22 over a desired sector of the disc 16. Data are stored in a plurality of concentric tracks 27 on the storage medium. Command and control electronics for the disc drive are provided on a printed circuit board (PCB) mounted in the housing.

Figure 2:
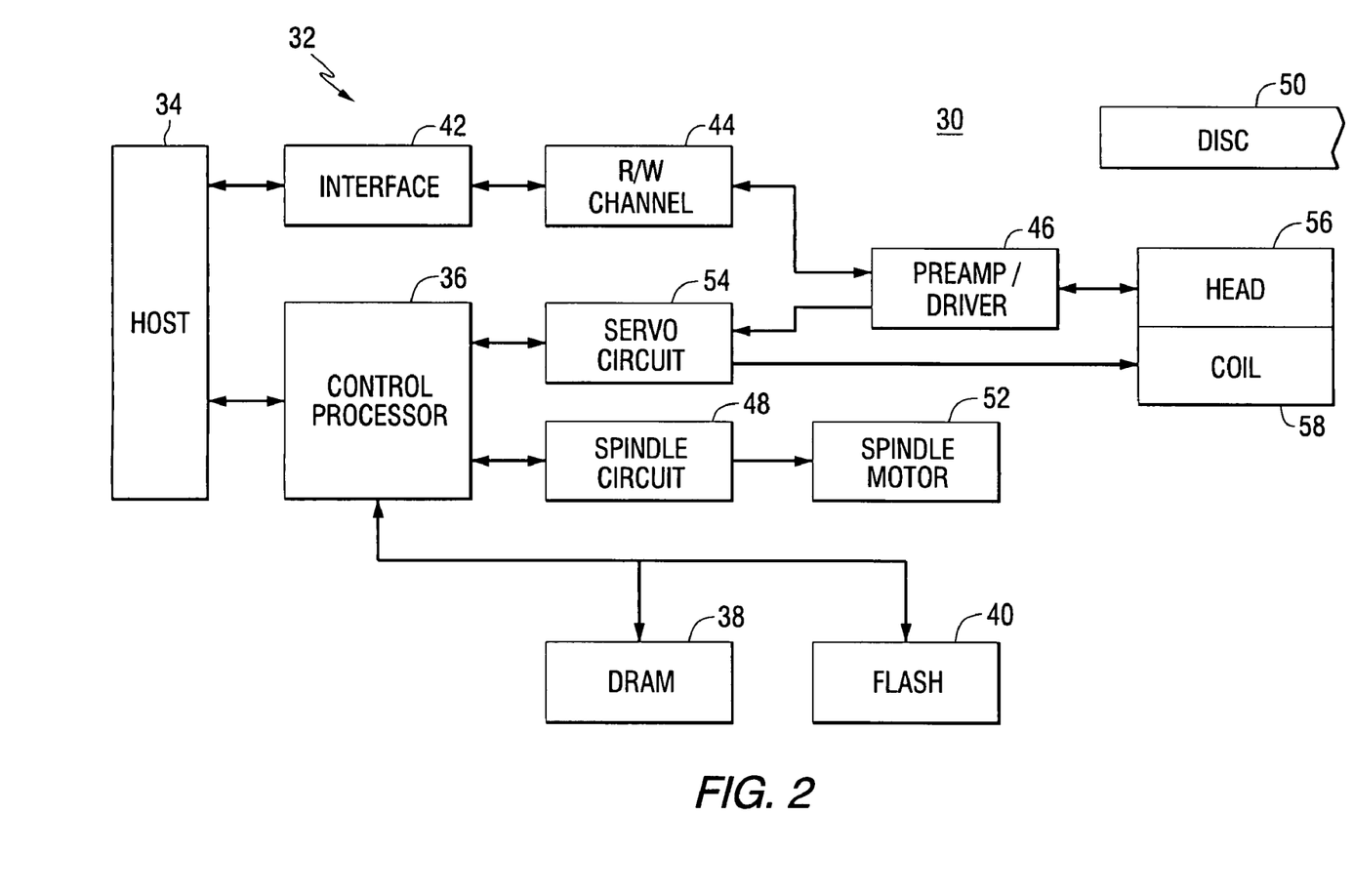
FIG. 2 is a block diagram of system including a disc drive constructed in accordance with the present invention.

A functional block diagram of an object-based storage system 30, including disc drive control circuitry 32, is provided in FIG. 2. A host computer 34 provides top level control of a disc drive control processor 36, which in turn controls the operation of the disc drive 30 in accordance with programming and information stored in dynamic random access memory (DRAM) 38 and non-volatile flash memory 40.

Data to be stored by the disc drive are transferred from the host computer 34 to an interface circuit 42, which includes a data buffer for temporarily buffering the data and a sequencer for directing the operation of a read/write channel 44 and a preamp/driver circuit 46 during data transfer operations. A spindle circuit 48 is provided to control the rotation of the discs 50 by the spindle motor 52.

A servo circuit 54 is provided to control the position of one or more recording heads 56 relative to one or more discs 50 as part of a servo loop established by the head 56, the preamp/driver 46, the servo circuit 54 and the coil 58 that controls the position of an actuator arm. The servo circuit 54 includes a digital signal processor (DSP) which is programmed to carry out two main types of servo operation: seeking and track following.

Figure 3:
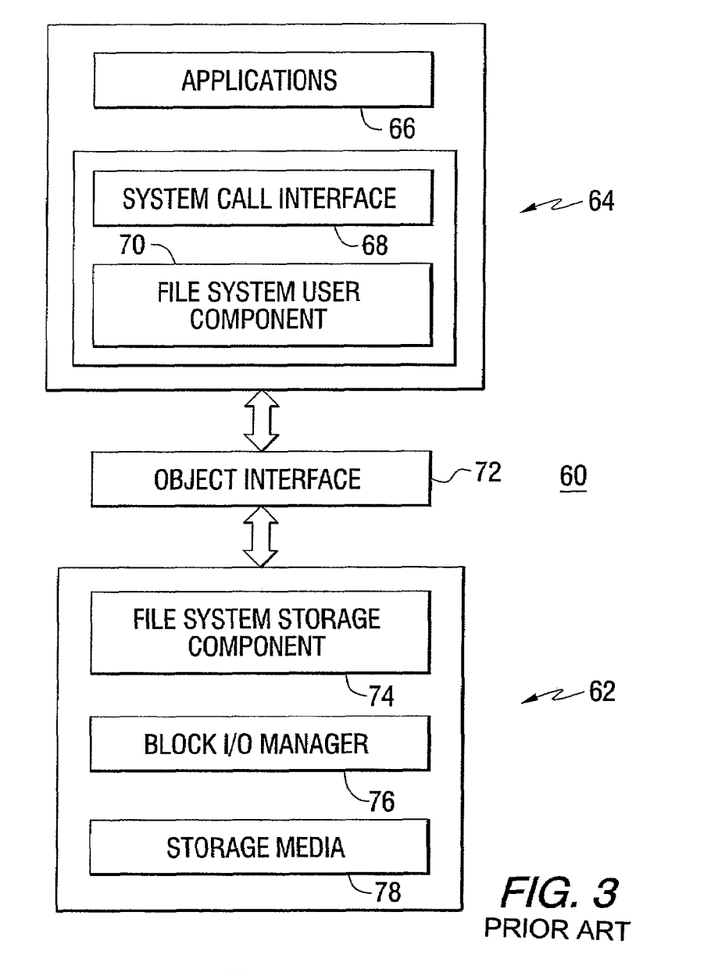
FIG. 3 is a block diagram of an object-based storage system.

FIG. 3 is a block diagram of an object-based storage system 60 including an OSD disc drive 62 in accordance with the present invention. A host computer 64, which may run numerous applications 66, includes a system call interface 68 and a file system user component 70. The host transmits information through an object interface 72 to the OSD disc drive 62. The disc drive includes a file system storage component 74, a block input/output manager 76, and one or more storage media 78.

This invention addresses a fragmented OSD file system by ensuring that fragmentation does not result in significant performance degradation. The method minimizes the seek overhead during file access by organizing file fragments optimally and by eliminating command overhead for near sequential read and write access.

This invention selects object fragment locations during object create and write append operations to minimize the seek time between fragments by factoring in the physical layout of the disc. Factors, or characteristics of the storage medium, that are considered in the selection process include the total phase difference between the last block of a previous fragment and the start block of the next fragment. The phase difference is a value calculated during next command selection sorting. Each command in the queue has a starting phase and an ending phase. The starting phase is the location on the disc of the last block to transfer for the current command. For read commands, this may include read look-ahead data. The ending phase is the first block of the candidate's next command. The difference in time from the starting phase to the ending phase is the phase difference. The objective of the command sort operation is to find a next command with the smallest phase difference value that will result in the quickest command-to-command execution. There are two components to consider when calculating the phase difference: rotational latency and seek time. Rotational latency is the amount of time it takes for the target block to rotate under the head. Seek latency is the amount of time it will take for the actuator to move to the correct next track.

Figure 4:
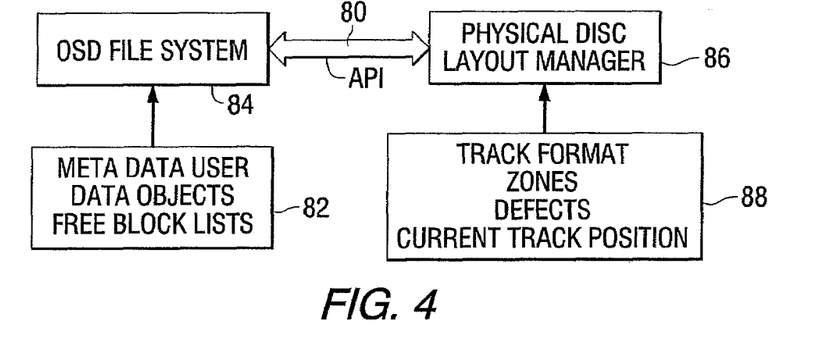
FIGS. 4 and 5 are block diagrams of portions of firmware in a disc drive controller.

FIG. 4 is a block diagram of the OSD and interface firmware layer communication. The OSD layer uses a firmware application program interface (API) 80 for making block requests to the drive. Free block lists 82 are maintained for the metadata and user data objects. The OSD file system 84 provides the OSD layer with candidate starting block locations when new user data blocks are needed to satisfy WRITE, WRITE APPEND, or CREATE commands. A physical disc-layout manager 86 receives the commands and controls the track format, zones, defects, and track position 88.

Figure 5:
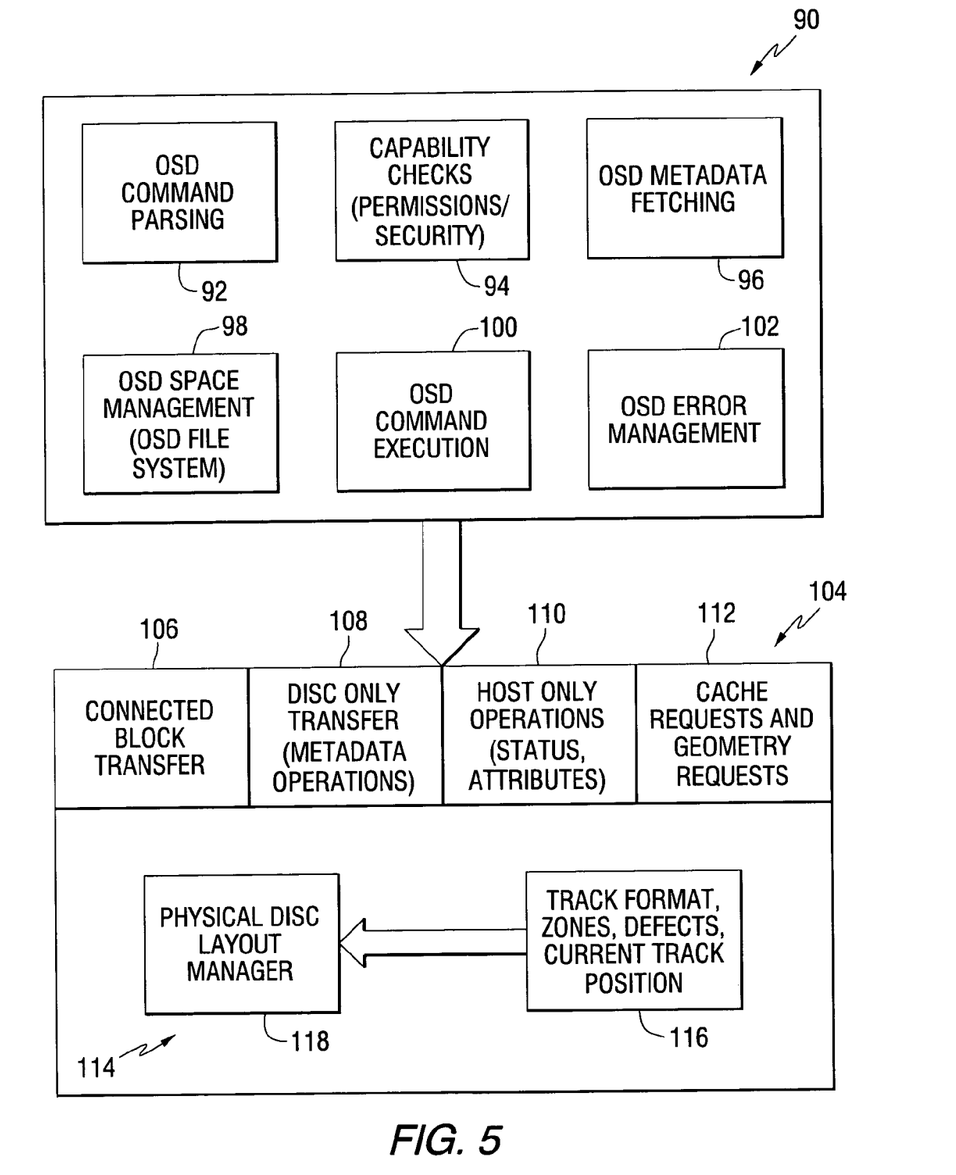

FIG. 5 is a more detailed block diagram of the drive firmware. An OSD firmware layer 90 includes firmware for command parsing 92, capability checks and permissions/security 94, metadata fetching 96, space management (OSD file system) 98, command execution 100, and error management 102. The application interface 104 includes firmware for implementing connected block transfers 106, disc only transfers 108, host only operations 110, and cache and geometry requests 112. Standard firmware 114 determines track format, zones, defects, and current track position 116 and provides this information to the physical disc layout manager 118.

The OSD layer contains firmware that parses and executes OSD commands. Each executed OSD command is typically broken into multiple steps: parse, metadata fetch, object data location calculations, standard firmware block command construction, and transfer requests made through the OSD API. The API is constructed to implement four general functions: connected transfers, disc only transfers, host only transfers and cache and geometry requests. Connected transfers are used to transfer data to/from the disc or to/from the host interface. Disc only transfers represent disc reads and writes that do not involve transfers to/from the host interface. Host only transfers are used to transfer data to/from the host interface. Cache and geometry requests are used to reserve buffer memory for ongoing OSD commands and to request particular services related to the physical geometry of the storage such as the number of sectors per track in the given zone, etc.

Geometry requests would be used for implementing the operations discussed in this description.

The functions illustrated in FIGS. 4 and 5 can be implemented in firmware in the disc drive controller. Typically, a single OSD command will generate multiple block command requests that provide the disc drive sorting algorithm with a steady stream of block requests. This is typical during the execution of general file system operations. For example, in a standard industry file system, a request to read a file will result in a file path named parse, a fetch for metadata associated with the file to determine the physical location of the file data, a fetch of the file data, and finally an update of the metadata with a timestamp, journaling information, etc. The OSD file system architecture is similar. The difference being that the file system is managed by the block storage device and therefore operations on lower levels of the file system are hidden from the client computing system.

As used herein, an object is an independent and unique collection of user data, system attributes and user defined attributes that is identified by a unique label and whose data are arbitrarily accessible with byte granularity. It is similar to a file except that unlike a file, an object binds attributes to file data. Each object includes metadata and user data. The OSD layer is responsible for layout of the file system metadata and user data on the media 82. Metadata blocks are used for storing the identity, attributes and locations of user data blocks, and to associate a user object to user data fragments.

As used herein, a fragment is a portion of user data that is not stored sequential to other user data that is part of the same file or object. A file is fragmented if ranges of the file data are scattered about the storage space. Fragmented files generally exhibit inferior read/write performance compared with non-fragmented files. To select the fragment locations, a firmware layer supporting OSD commands is added above the existing interface firmware module.

Figures 6, 7:
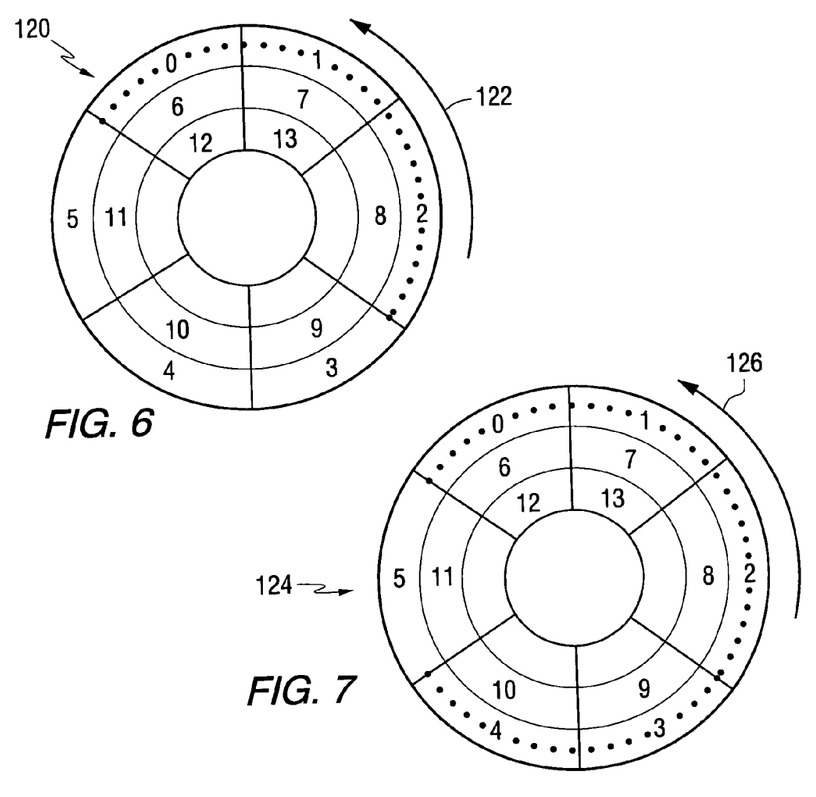
FIGS. 6, 7 and 8 are schematic representations of a disc storage medium.

The OSD layer is responsible for selecting media blocks to satisfy the OSD command requests. However, the OSD layer does not know exactly which blocks will minimize seek time given the position of the final block of the previous fragment. This is illustrated in FIG. 6. FIG. 6 is a schematic representation of a simplified disc media wedge layout 120 with object fragments numbered 1 through 13. The media rotates in the direction indicated by arrow 122. Each block is numbered in the sequence, and the blocks would be accessed sequentially. The dotted curve represents an object fragment previously reserved by the OSD system. Previously reserved blocks are data blocks that are in use by this or another object. These blocks were previously allocated and are no longer free for allocation to new data ranges. The blocks reserved are 0, 1 and 2.

Assume that another wedge is needed for a new write command, but a purely sequential next best block is not available since it has been reserved by another object. FIG. 6 is a schematic representation of a disc block layout 124, with two object fragments reserved. The disc rotates in the direction indicated by arrow 126. In the example of FIG. 7, a second object has reserved blocks 3 and 4. The object in question is the object currently requesting allocation of data blocks on its behalf. Since the object in question needs additional blocks and the next sequential blocks are not available, the next best available blocks should be reserved for this object.

Typically, since the actual physical layout is not known for certain, block 5 appears to be the closest. But actually, since switching tracks can be accomplished faster than rotating to block 5, block 10 is closer to the end of block 2 than block 5. Block 9 is impossibly close; made so by the command set up overhead requiring too much time to set up the disc hardware in time.

In prior devices, the file system is not aware of the physical layout and cannot make an actual best candidate determination for certain. The invention solves the problem by asking the physical layout manager to perform the typical phase difference calculations in reverse to determine best seek time, given a range of sequential blocks as an input.

The disc drive maintains a collection of physical recording zones, which differ from each other in the number of physical blocks on a track and by the frequency of the bits transferred. The target zone is the zone in which the OSD has determined there are enough blocks to meet the current demand for unassigned blocks. The OSD layer will provide a range of candidate blocks based upon the average number of blocks in the target zone plus the number of blocks needed in the request. In essence, the physical layout manager is provided with a starting seek block location, a starting candidate block location and the number of blocks sequential to the candidate block to consider. The OSD file system maintains a record of every block that includes the physical location and whether or not it has been assigned to an object. The number of blocks provided will exceed the actual number of blocks required by the OSD request by at least a track.

The OSD layer is not privy to the physical characteristics of the media format. It is unaware if blocks have been reallocated or slipped during format. It is also unaware of a block's orientation to the end of the track, or a block's address relationship to the phase difference with respect to another block. So the OSD provides a range of block candidates to the firmware that does have knowledge of these physical characteristics of the media format. Armed with this information, the media-aware firmware can find an optimum starting block anywhere, since it is provided with enough blocks to choose a starting block from within anywhere over an entire track. The firmware can optimize both the rotational latency and the seek latency to calculate the best ending phase based upon knowledge of the starting phase. The physical layout manager will search for the closest block from the starting seek block and return this to the OSD layer. From this information, the OSD layer will be provided with the best candidate starting block with which the fragment can be reserved. On the other hand, if only the desired number of blocks is offered to the media-aware firmware, then the solution is constrained since the media-aware firmware does not know which blocks are in use and which blocks are free. And if the OSD selects a starting block itself, then it is guessing whether the block selected will result in optimal performance.

Figure 8:
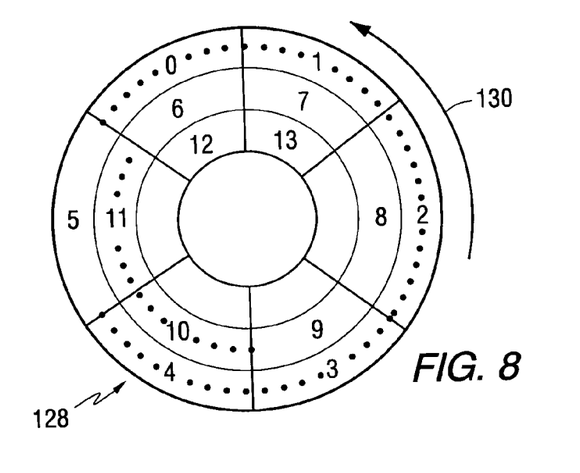

FIG. 8 is a schematic representation of an OSD disc-layout 128 with near sequential object fragments. The disc rotates in the direction illustrated by arrow 130. FIG. 8 shows that an existing object needs to append blocks to the end of the logical object. In this case the object needing an allocation already owns blocks 0-2. Ideally, blocks 3-4 would be allocated since they are sequential to 0-2. However, another object has already claimed blocks 3-4. The algorithm will return blocks 10-11 as the best candidates since they have the smallest phase difference from the end of the initial object fragment ending phase block 2. Block 9 is not selected since the command overhead in setting up the block transfer would be too large to access this block without incurring an additional revolution of the disc.

The phase calculation determines the Seek Time as: Seek Time (MINIMUM)=Current Location+Best Candidate Starting Block from a list, where the list is the numerical range of blocks from which a selection is to be made.

This is essentially how a next best command is determined by existing systems, all else being equal. The OSD system will use these calculations not on commands, but on a range of candidate blocks for a single command. This then will ensure that future requests from this object will be deterministically pre-sorted for near sequential access. This method results in a static sorting of sequential accesses. Once a fragmented object allocation has been optimized for sequential performance, then the command sorting firmware will not need to sort the requests dynamically. If this results in a performance advantage, the commands will essentially have been pre-sorted due to the static allocation performed earlier.

The method specified for an OSD device differs from previous methods because it is deterministic. Previous methods rely on the storage device host to send commands in a preferred order and to ensure that all requests are related to one another in order to gain a benefit. This is speculative and can become problematic when multiple hosts are accessing the same device or when the host file system is tasked with running multiple unrelated applications.

The OSD determinism comes into play since it is the only implementation that knows positively whether multiple data blocks requested or written by hosts are related and so can allocate the data blocks on the disc in a way that can maximize write and read performance deterministically.

The OSD method would calculate all factors that have an impact on the ultimate seek time and select the best track/sectors based upon the lowest seek time and write data to these sectors. Such factors include: block command overhead, phase difference minimization from last block sequentially from a previous fragment, reallocated sectors, slipped sectors, track crossing, zone crossing, number of blocks on a track, and track skew. The OSD method has an advantage for allocation since before selecting blocks for a write allocation, it is known where the end of previously written fragments of an object are located. This information does not exist in a non-OSD interface.

The OSD method supports write operations with arbitrary block lengths. In the OSD approach, it is known whether write requests are related by being part of the same object and so optimization is deterministic. The OSD approach knows which blocks are related and which order of block reads will result in sequential access.

The OSD approach uses an allocation method that does not assume that the next available block, as described by a block bit map, is the closest block. Also, it employs a universal naming convention, which is completely unambiguous regardless of how many hosts are making requests.

While the invention has been described in terms of several embodiments, it will be apparent to those skilled in the art that various changes can be made to the described embodiments without departing from the scope of the invention as set forth in the following claims.

What is claimed is:

1. An apparatus comprising:
 a storage medium;
 an arm for positioning a recording head adjacent to the storage medium; and
 a controller for receiving objects and for selecting blocks on the storage medium to be written by the recording head based on information in the objects, wherein the controller selects object fragment locations using a total phase difference between a last block of a previous fragment and a start block of the next fragment.

2. The apparatus of claim 1, wherein the controller includes:
 an object-based file manager; and
 a physical layout manager.

3. The apparatus of claim 2, wherein the object-based file manager and the physical layout manager are implemented in firmware.

4. The apparatus of claim 2, wherein the object-based file manager identifies a candidate starting block for the objects.

5. The data storage device of claim 1, wherein the medium comprises a rotatable data storage disc, and wherein the blocks are arranged on tracks defined on a surface of the data storage disc.

6. The data storage device of claim 1, wherein the objects include a range of sequential blocks of data.

7. The data storage device of claim 1, wherein the objects include user data and metadata.

8. The data storage device of claim 1, wherein the controller selects object fragment locations during object create and write append operations to minimize the seek time between fragments using physical layout characteristics of the storage medium.

9. A method for writing data in data storage devices, the method comprising:
 receiving access commands for objects;
 selecting blocks on a storage medium to be written by a recording head based on information in the objects;
 writing data from the objects to the selected blocks; and
 deterministically pre-sorting requests for the objects.

10. The method of claim 9, wherein the step of selecting blocks includes the step of identifying a candidate starting block location and a number of blocks sequential to the candidate block location for the objects.

11. The method of claim 10, wherein the number of blocks sequential to the candidate block location exceeds an actual number of blocks required by the object.

12. The method of claim 9, wherein the data objects include a range of sequential blocks of data.

13. the method of claim 9, wherein the objects include user data and metadata.

14. The method of claim 9, wherein the step of selecting blocks includes selecting object fragment locations during object create and write append operations to minimize the seek time between fragments using physical layout characteristics of the storage medium.

15. The method of claim 14, wherein the physical layout characteristics include one or more of:
 block command overhead, phase difference, reallocated sectors, slipped sectors, track crossing, zone crossing, number of blocks on a track, and track skew.

16. The method of claim 9, wherein a single object generates multiple block requests.

17. A method for writing data in data storage devices, the method comprising:
 receiving access commands for objects;
 selecting blocks on a storage medium to be written by a recording head based on information in the objects; and
 writing data from the objects to the selected blocks;
 wherein the step of selecting blocks includes selecting object fragment locations during object create and write append operations to minimize the seek time between fragments using physical layout characteristics of the storage medium; and
 wherein the object fragment locations are selected using a total phase difference between a last block of a previous fragment and a start block of the next fragment.

18. A method for writing data in data storage devices, the method comprising:
  receiving access commands for objects;
  selecting blocks on a storage medium to be written by a recording head based on information in the objects;
  writing data from the objects to the selected blocks; and
  maintaining a collection of physical recording zones, which differ from each other in a number of physical blocks on a track and by a frequency of the bits transferred.

* * * * *

UNITED STATES PATENT AND TRADEMARK OFFICE
CERTIFICATE OF CORRECTION

| | |
|---|---|
| PATENT NO. | : 7,590,799 B2 |
| APPLICATION NO. | : 11/154307 |
| DATED | : September 15, 2009 |
| INVENTOR(S) | : Fish et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1126 days.

Signed and Sealed this

Twenty-first Day of September, 2010

David J. Kappos
*Director of the United States Patent and Trademark Office*